US 8,250,628 B2

(12) United States Patent
Brodfuehrer et al.

(10) Patent No.: US 8,250,628 B2
(45) Date of Patent: Aug. 21, 2012

(54) DYNAMIC AUGMENTATION, REDUCTION, AND/OR REPLACEMENT OF SECURITY INFORMATION BY EVALUATING LOGICAL EXPRESSIONS

(75) Inventors: Richard J. Brodfuehrer, Endicott, NY (US); Corey C. Bryant, Poughkeepsie, NY (US); Saheem Granados, Poughkeepsie, NY (US); Stanley Yan, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/549,955

(22) Filed: Aug. 28, 2009

(65) Prior Publication Data

US 2011/0055902 A1    Mar. 3, 2011

(51) Int. Cl.
*H04L 29/06* (2006.01)
(52) U.S. Cl. .................. 726/2; 726/1; 726/28; 726/29
(58) Field of Classification Search ............ 726/4, 1–2, 726/28–29
See application file for complete search history.

(56) References Cited

U.S. PATENT DOCUMENTS

| | | |
|---|---|---|
| 6,950,819 B1 | 9/2005 | Behera |
| 7,024,693 B2 | 4/2006 | Byrne |
| 7,124,132 B1 | 10/2006 | Hayes et al. |
| 7,167,918 B2 | 1/2007 | Byrne et al. |
| 7,185,361 B1 | 2/2007 | Ashoff et al. |
| 7,284,265 B2 | 10/2007 | Choy et al. |
| 7,356,840 B1 | 4/2008 | Bedell et al. |
| 7,392,546 B2 | 6/2008 | Patrick |
| 7,440,962 B1 | 10/2008 | Wong et al. |

(Continued)

FOREIGN PATENT DOCUMENTS

EP    1143663 A2    10/2001

(Continued)

OTHER PUBLICATIONS

PCT International Search Report and The Written Opinion of the International Searching Authority, or the Declaration; date of mailing Dec. 14, 2010; International Application No. PCT/EP2010/062007.

(Continued)

*Primary Examiner* — Jung Kim
*Assistant Examiner* — Ayoub Alata
(74) *Attorney, Agent, or Firm* — Cantor Colburn LLP; William A. Kinnaman, Jr.

(57) ABSTRACT

Method, server, and computer product for modifying base permissions of access control lists (ACL) by evaluating logical expressions (LE). Base permissions are determined for a subject by comparing a name of subject against ACL entries for an object. ACL entries having LE entries are determined. LE entries are evaluated to determine which LE entries are true for LE attributes of the subject. Set operators of LE entries are combined to single union ACL, intersect ACL, and replace ACL. Replace operation performed to replace base permissions with replace ACL, resulting in first output. If no replace ACL, base permissions are the first output. Union operation is performed on first output and union ACL, resulting in second output. If no union ACL, first output is second output. Intersect operation performed on second output and intersect ACL, resulting in third output. If no intersect ACL, permissions of second output are the third output.

19 Claims, 6 Drawing Sheets

U.S. PATENT DOCUMENTS

| | | | |
|---|---|---|---|
| 7,496,687 B2 | 2/2009 | Griffin et al. | |
| 7,506,357 B1 | 3/2009 | Moriconi et al. | |
| 2003/0200467 A1* | 10/2003 | Choy et al. | 713/202 |
| 2004/0243823 A1 | 12/2004 | Moyer et al. | |
| 2008/0127354 A1 | 5/2008 | Carpenter et al. | |
| 2009/0064342 A1* | 3/2009 | Chan et al. | 726/27 |
| 2009/0205018 A1 | 8/2009 | Ferraiolo et al. | |

FOREIGN PATENT DOCUMENTS

| | | | |
|---|---|---|---|
| WO | 0138971 A3 | 5/2001 | |

OTHER PUBLICATIONS

Lhomme et al., "Enhancement of Localization Accuracy in Cellular Networks via Cooperative Ad-Hoc Links", pp. 1-5, Center for TeleInFrastruktur (CTIF), Aalborg University, Aalborg, Denmark; The 3rd International Conference on Mobile Technology, Application and Systems—Mobility 2006.

* cited by examiner

FIG. 4
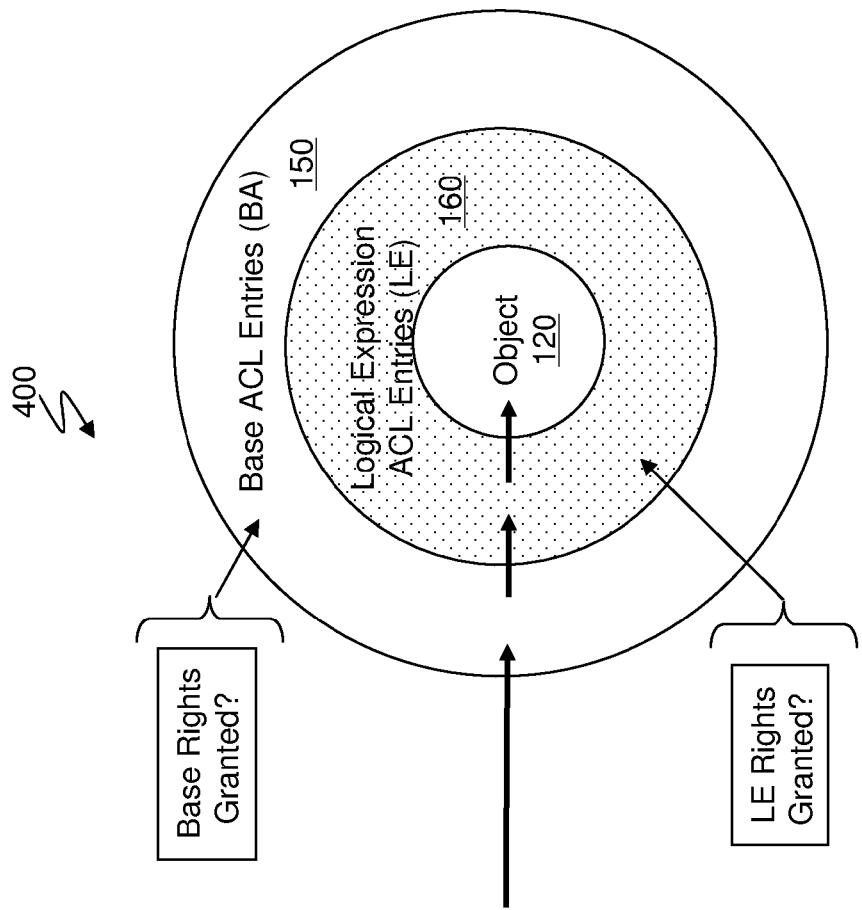
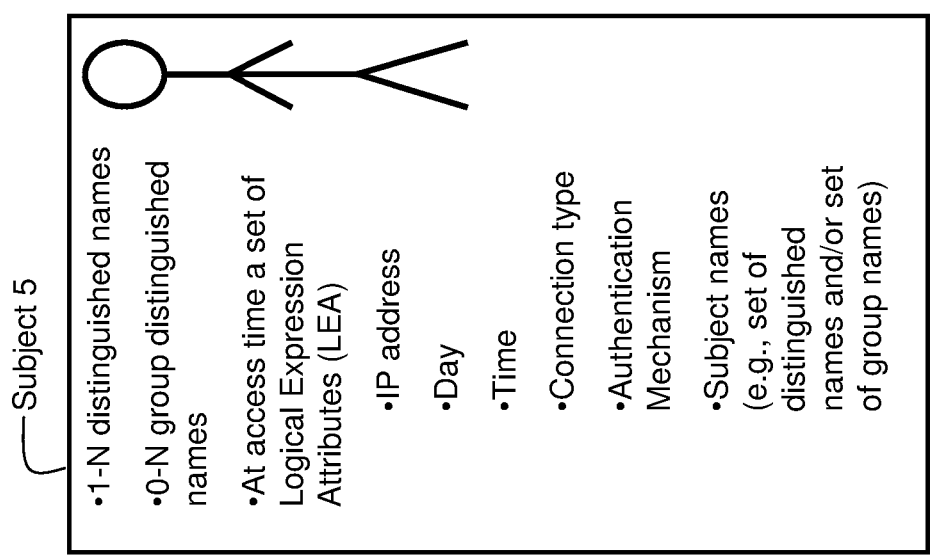

DYNAMIC AUGMENTATION, REDUCTION, AND/OR REPLACEMENT OF SECURITY INFORMATION BY EVALUATING LOGICAL EXPRESSIONS

BACKGROUND

Exemplary embodiments relate to access control lists, and more specifically, to dynamic augmentation, reduction, and/or replacement of access control lists by means of evaluating logical expressions associated with the access control lists.

As different technologies mature, more businesses have decided to leverage distributed technologies to enhance their business processes. Many times, these distributed technologies are leveraged to expand a business's reach to go beyond local areas. The Internet and other networks may provide the infrastructure for this expansion. One fundamental and extremely necessary issue that must be addressed when using informational technology as the backbone for all business operations is access control. Conceptually, access control consists of ensuring a subject entity has sufficient rights to perform operations on objects. Setting up access control properly and establishing sufficient security processes are both well understood but additional features should be available.

SUMMARY

According to one exemplary embodiment, a method for modifying base permissions of access control lists by evaluating logical expressions on a server. A server determines base permissions for a subject by comparing a name of the subject against access control list entries for an object. The server maintains the access control list entries for the object that comprise base entries and logical expression entries. The logical expression access control list entries also include one of the following set operators: union, intersect, or replace. In addition to determining what base entries apply to the subject, the server determines the logical expression entries of the access control list entries for the object with logical expression attributes of the subject. The logical expression entries are evaluated to determine which logical expression entries are true for the logical expression attributes of the subject. For logical expression entries that are true, the server combines set operators of the logical expression entries to have a single union access control list, a single intersect access control list, and a single replace access control list. In response to there being the replace access control list, the server performs a replace operation to replace the base permissions defined by the base entries with the replace access control list, and a result of the replace operation is a first output. In response to there being no replace access control list, the base permissions are the first output. In response to there being the union access control list, the server performs a union operation on the first output and the union control access list, and a result of the union operation is a second output. In response to there being no union access control list, the first output is the second output. In response to there being the intersect access control list, the server performs an intersect operation on the second output and the intersect access control list, and a result of the intersect operation is a third output. In response to there being no intersect access control list, the second output is the third output. The server provides the third output as the effective rights for the subject.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features of the present disclosure are apparent from the following detailed description taken in conjunction with the accompanying drawings in which:

FIG. 4 illustrates a conceptual view of a subject access diagram in accordance with exemplary embodiments.

DETAILED DESCRIPTION

For access control, taking the location of requesting entities into account usually is not as easy as taking the names of the entities into account. International and local laws may impact a business's operations as it expands beyond its locality. Intranet and firewall technologies may also introduce distinct locations from where entities request permission. Access control should be capable of transforming a subject's rights given its location as described in exemplary embodiments. Further, the time of requests should also play a role in determining a subject's rights in exemplary embodiments.

As will be seen herein, time and location are just examples of subject attributes that may be factored in during authorization. These attributes are what make up logical expression attributes as discussed in exemplary embodiments. For example, logical expression attributes may include the set of the 1-N names of the subject, 0-N group names, the IP address of the subject, day, time, connection type of the subject, authentication mechanism, etc. Moreover, an administrator implementing the logical expression attributes may include additional logical expression attributes as desired.

Figure 1:
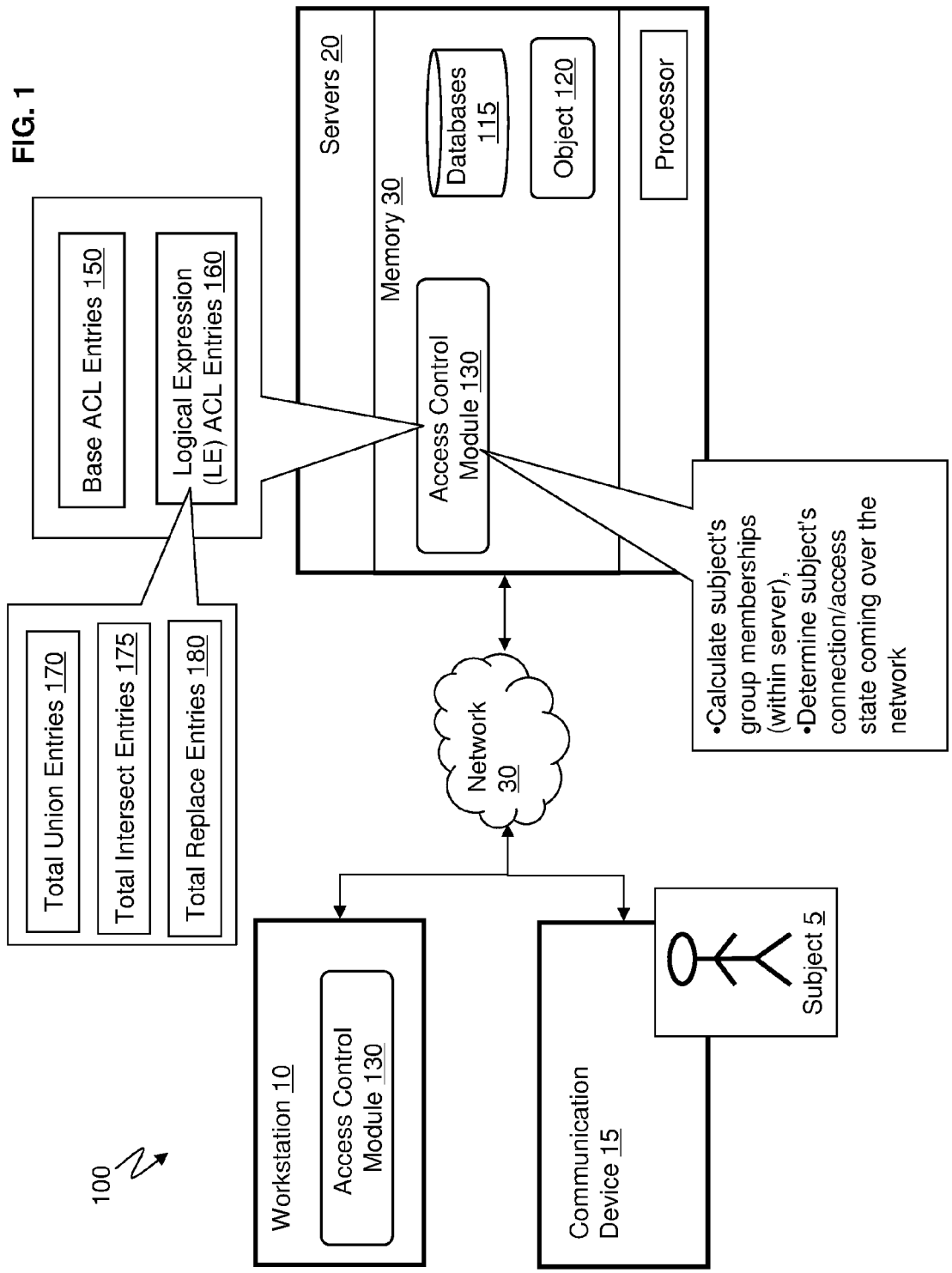
FIG. 1 illustrates a block diagram in accordance with exemplary embodiments.

In FIG. 1, communication devices 15 are operative to communicate with one or more servers 20 over a network 30. The communication devices 15 may include, for example and without limitation, mobile telephones, landline telephones, smart telephones, soft telephones, personal digital assistants, set top boxes (STB), televisions (TV), game consoles, MP3 players, computers, and servers.

Further regarding the network 30, the network 30 may include circuit-switched and/or packet-switched technologies and devices, such as routers, switches, hubs, gateways, etc., for facilitating communications. The network 30 may include wireline and/or wireless components utilizing, e.g., IEEE 802.11 standards for providing over-the-air transmissions of communications. The network 30 can include IP-based networks for communication between a customer service center and clients/users. The network 30 can manage multiple accounts as established by particular users. These accounts may then be used to provide access to services as described herein. Also, the network 30 may include wireline and/or wireless components utilizing standards, e.g., multimedia messaging services (MMS). The network 30 may include a multimedia messaging center (MMC), which implements the network side of multimedia messaging service (MMS) and makes it possible for an operator to offer multimedia messaging to mobile communication device users. The network 30 can include a managed IP and/or wireless network administered by a service provider, which can control bandwidth and quality of service for the communications discussed herein. The network 30 may be implemented in a wireless fashion, e.g., using wireless protocols and technologies, such as Wi-Fi®, WiMAX™, Bluetooth®, etc. The network 30 can also be a packet-switched network, such as a local area network, a wide area network, a metropolitan area network, an Internet network, or other similar types of networks. The network 30 may be a cellular communications network, a fixed wireless network, a wireless local area network (LAN), a wireless wide area network (WAN), a personal area network (PAN), a virtual private network (VPN), an intranet or any other suitable network, and the network 30 may include equipment for receiving and transmitting signals, such as a cell tower, a mobile switching center, a base station, and a wireless access point.

An access control module 130 on the workstation 10 and/or on the server 20 may be utilized to program, set permissions and rights, and input data on the servers 20 in accordance with exemplary embodiments. The workstation 10 may be directly connected to the servers 20, integrated with the servers 20, and/or operatively connected to the servers 20 over the network 30. Further, the server 20 may include the access control module 130 in whole and/or in part and may interface with the access control module 130.

For example, an administrator utilizing the access control module 130 on the workstation 10 and/or the server 20 may set access control for an object 120. For explanation purposes, the object 120 is illustrated on the server 20. However, the object 120 may be on additional servers 20. Also, the object 120 may represent various applications, programs, databases, servers, etc., that a subject 5 utilizing the communication device 15 may desire to access. It is understood that the object 120 illustrated on the server 20 is not meant to be limited and is depicted on the server 20 for illustration purposes only. For illustration purposes, the access control module 130, object 120, and databases 115 are coupled to the memory 30 of the server 20. The memory 30 is a computer readable medium having computer executable instructions that can be processed by a processor.

In exemplary embodiments, the subject 5 and communication device 15 may be utilized interchangeably since the subject 5 is attempting to access the object 120 utilizing the communication device 15. Accordingly, if the subject 5 is used, the subject 5 may represent both the subject 5 and the communication device 15. Likewise, if the communication device 15 is used, the communication device 15 may represent both the subject 5 and communication device 15 since the subject 5 is utilizing the communication device 15 to access the object 120. The administrator utilizing the access control module 130 must establish rights for the subject 5, e.g., in advance. This administrative task may utilize mechanisms, like wildcards, to set locations, credential, and/or time requirements and other logical expression attributes for sets of rights. Then, a requesting entity such as the subject 5 presents its credentials from a remote location, e.g., the location of the communication device 15, at a given time for authentication. Once authenticated, the credentials, the time, and the location of the entity are utilized when authorizing a request for object 120 access in accordance with exemplary embodiments.

Exemplary embodiments provide a novel approach in determining the rights of a requesting entity, such as the subject 5. This approach will provide administrators more flexibility and simplify the administrator's process for establishing the subject's 5 rights when taking into account, e.g., time and location, and the process of determining rights provides the flexibility as discussed herein.

Prior to determining rights for authorization checks, the administrator may define sets of rights with associated database type filters and calculation operators utilizing the access control module 130. These filters can be defined using location, credentials, and time attributes and other LEAs. It is understood by one skilled in the art that more complex filters may be utilized, and examples provided herein are only for explanatory purposes. Further, these filters of the access control module 130 may contain relational type predicates and logical operators like AND, OR, and NOT.

For example, IP=192.*AND SUBJECT=login1 AND DAY>=May 27th and DAY<May 28th.

The calculation operators are used by the access control module 130 when performing authorization checks to calculate the final effective set of rights applicable to the subject 5 requesting access to the object 120, at that (specific) given time. Given this flexibility of exemplary embodiments, the process of determining rights of the subject 5 is not a basic key-like look-up to retrieve an active set of rights as seen in state of the art systems. Instead, the process of the access control module 130 may be explained in the following operations:

1. Determine base rights, e.g., using a key like lookup.
2. Gather all applicable sets of rights whose filters evaluate to TRUE given the location, subject, and time of day, and other LEAs.
3. Using the operators associated with the results of step 1, incrementally combine all of the results of step 1 to establish the granted rights for the subject, location, and time and other LEAs. These granted rights are then used to perform authorization and/or rejection of the request for access.

Unlike state of the art systems that rely on table like lookups, exemplary embodiments perform the determination of rights as an incremental process via the access control module 130. The incremental process is dynamic based on the subject's 5 current logical expression attributes determined by the control module 103. This incremental process allows administrators to reduce the number of specifications they must define in order to establish rights needed for authorization checks.

As an example, consider a case when access control for a given object 120 requires many, very granular specifications of rights. The many granular specifications, in conjunction with a large domain of possible subjects and associated LEAs, would require the explicit specification of effective sets for every possible permutation of the set of subjects and LEAs. Often, the different sets of effective rights have marginal differences. Analogous to a mathematical function that defines a rule for mapping a very large domain to a very large range, the incremental process of the access control module 130 will allow an administrator to represent a wide range of subject and LEAs to effective rights without having to explicitly specify every mapping. For example, utilizing the access control module 130, an administrator can set one new LE ACL for IP=1.2.3.* rather than updating every single existing subject and group ACL with the IP IP=1.2.3.*.

For explanation purposes, the servers 20 may be Lightweight Directory Access Protocol (LDAP) servers. LDAP servers are a clear example of a distributed application managing access control. Exemplary embodiments may be implemented by LDAP server products but exemplary embodiments are not limited LDAP servers. In LDAP server 20 of exemplary embodiments, the subject 5 is represented by a credential. Credentials are presented by the entity (subject and communication device 15) requesting access at bind time. The subject 5 on the communication device 15 may communicate with the server 20 to request permission for accessing the object 120, and also the access control module 130 interfaces with the communication device 15 of the subject 5 to obtain credentials. For example, the credentials received by the access control module 130 of the server 20 may include a bind distinguished name (DN) (or subject name) and password, an X.509 certificate, and/or a Kerberos ticket. These credentials can be members of groups. For example, the credentials of the subject 5 may be recognized by the access control module 130 as being part of one or more groups. As a member, the credentials of the subject 5 may inherit the rights given to the group. The rights are access control lists (ACL) permission(s), and the objects (e.g., object 120) are LDAP entries, e.g., in a database 115. Accordingly, the subject 5 may have one or more subject names and/or a group names. An LDAP administrator must set explicit ACL permissions for entries and/or sets of entries in the database 115. The administrator must set ACLs for each allowable credentials and/or for groups that have members.

The following example shows an LDAP entry (e.g., object 120) with 2 base ACL entries (such as base ACL entries 150) and 1 ACL entry with an ACL filter (such as logical expression ACL entry 170, 175, and/or 180). In this example, the LEAs may be:
ibm-filterMechanism, ibm-filterTimeOfDay, ibm-filterIP.
    dn: ou=Second Tier, ou=Male Olympians, o=Olympians, o=Olympia,o=sample
    objectclass: organizationalunit
    ou: Second Tier
    description: second tier Olympians
    aclentry:     access-id:CN=DIONYSOS, OU=SECONDTIER, OU=MALE OLYMPIANS, O=OLYMPIANS, o=Olympia, o=sample:
    normal:rsc:object:ad
    aclentry: access-id:CN=HERMES, OU=SECOND TIER, OU=MALE OLYMPIANS, O=OLYMPIANS, o=Olympia, o=sample:normal:rsc
    aclentry: access-id:CN=HERA, OU=FEMALE OLYMPIANS, O=OLYMPIANS, o=Olympia, o=sample:object: ad:normal:
    rwsc:sensitive:rwsc:critical:rwsc
    aclentry:aclFilter:(&(&(ibm-filterMechanism=SIMPLE) (ibmfilterIP=127.0.0.1))(&(ibm-filterDayOfWeek<=6) (ibmfilterTimeOfDay>=00:00))):intersect:normal:rwsc: at.cn:deny:w:restricted:rs By utilizing the credentials, as obtained from the subject 5 on the communication device 15, the access control module 130 may establish base ACL entries 150 from the database 115. Base ACL entries 150 can be established by matching attributes from the subject 5 in the database 115. Consider the case where the credential can be used from vastly different IP addresses. In such a case with state of the art systems, the different IP addresses would result in the requirement for many different ACL permission(s) entries, and it can be cumbersome for a security administrator to ensure all the IP addresses for a credential satisfy the security requirements.

However, exemplary embodiments may utilize the ACL matching attributes, but in addition to setting a specific ACL given the attributes, the access control module 130 is configured to allow for incremental updates to the base ACL permissions 155 based on logical expression attributes (including the IP address of the communication device 15, credential, authentication mechanism, access date of the communication device 15, and/or access day of the communication device 15, and/or access time of the communication device 15). According to exemplary embodiments, the incremental updates by the access control module 130 include:

1. An augmentation of the base ACL permissions 150 when using a union keyword;
2. The reduction of the base ACL permissions 150 when using an intersect keyword; and
3. Replacement of the base ACL permissions 150 when using a replace keyword.

At times, examples may be described with reference to IP addresses for explanation purposes only, and one skilled in the art understands that exemplary embodiments are not meant to be limited to IP addresses.

In exemplary embodiments, base ACL entries 150 correspond to and/or relate to base ACL rights/permissions for the subject 5 attempting to access the subject 120. Also, logical expression (LE) ACL entries 160 correspond to and/or relate to logical expression (LE) ACL rights/permissions. Likewise, total union ACL entries 170, total intersect ACL entries 175, and total replace ACL entries 180 correspond to and/or relate to total union ACL rights/permissions 170, total intersect ACL rights/permissions 175, and total replace ACL rights/permissions 180. The terms above may be utilized interchangeably in the present disclosure as understood by one skilled in the art.

In exemplary embodiments, the union keyword of the access control module 130 allows an administrator to guarantee a minimum set of permission(s) given the LEAs, e.g., an IP address, credential, authorization mechanism, and/or access time. The intersect keyword allows an administrator to reduce a set of permission(s) while ensuring only certain permission(s) are available if and only if the base ACL permission(s) 150 grant the permission.

By utilizing the access control module 130, the current ACL specification may be expanded to include a logical expression specified as a search filter field and an additional set operation field (e.g., in the database 115) in accordance with exemplary embodiments. The access control module 130 compares the search filter fields against the subject and its LEAs and the additional operation fields of the database 115 to incrementally create logical expression (LE) ACL entries 160. The access control module 130 utilizes the LE ACL entries 160 to determine LE permissions 160. As an example, the specification may be updated to look like the following:
    aclentry:[access-id:|group:|role:]subject_DN:granted rights|aclFilter:filter:operation:granted_rights(square brackets represent optional items)
    where:
    operation:—union|intersect|replace
    filter:—a basic LDAP search filter that will contain predicates that can use attributes that represent a subjects LEAs. For example, following attributes may be used:
    ibm-filterIP
    ibm-filterDayOfWeek
    ibm-filterTimeOfDay
    rights:—standard ACL specification, i.e., a set of permissions for different types of LDAP object specifications, may include explicit permission denies FIG. 4 illustrates a conceptual view of a subject access diagram 400 in accordance with exemplary embodiments. Conceptually, the ACL determination process may be explained as follows.

The access control module 130 determines the base set of ACL permissions 150 given the base ACL entries 150 applicable to the credential. The base ACL permissions 150 given the base ACL entries 150 represent the state of the art systems.

Note that the base ACL permissions 150 given the base ACL entries 150 do not take into account the new filter fields in the ACL and the new matching attributes in the database 115 according to exemplary embodiments. Exemplary embodiments allow migrating (additional) installations to not require modifications of existing ACL specifications base ACL entries 150. The access control module 130 gathers any logical expression (LE) entries 150 whose filters evaluate to TRUE given the matching logical expression attributes: credentials, time of access, IP addresses, authentication mechanism, etc. Consider the following two examples:

First, access is attempted by the subject 5 between Saturday (represented as number 6), Sunday (represented as number 0), reduce rights aclentry: aclFilter:(|(ibm-filterDayOfWeek=0)(ibm-filterDayOfWeek=6)):intersect:critical:rwsc:restricted:rwsc Second, access is attempted by the subject 5 with the same computer (e.g., communication device 15), Monday-Friday, guarantee a minimal set of rights aclentry: aclFilter:(&(ibm-filterIP=127.0.0.1)(ibm-filterDayOfweek>=1))(ibm-filterDayOfWeek<=5)):UNION:critical:rwsc:restricted:rwsc If multiple ACL entry filters evaluate to TRUE, the access control module 130 unions all the rights of the same operation type to set one distinct representative ACL entry for the intersect, union, and replace operation types for the subject 5. That is, for each operation, the access control module 130 determines and groups together a total union ACL entries 170, a total intersect ACL entries 175, and a total replace entries 180 for the subject 5. As seen in FIG. 1, the LE ACL entries 160 include the total union ACL entries 170, the total intersect ACL entries 175, and the total replace entries 180 for the subject 5.

The access control module 130 may apply each of the representative total intersect ACL entries 175, representative total union ACL entries 170, and representative total replace ACL entries 180 to the base ACL entries 150 in the following order:

1. If the total replace ACL entries 180 are obtained by the access control module 130 from the database 115, the access control module 130 is operative to replace the base ACL entries 150 with the total replace ACL entries 180 permissions for the subject 5.

2. If the total union ACL entries 170 are obtained by the access control module 130 from the database 115, the access control module 130 is operative to union the total union ACL entries 170 permissions to the resulting set of permissions from operation 1 or to the base ACL entries 150 if there is no total replace ACL entries 180.

3. If the total intersect ACL entries 175 are obtained by the access control module 130 from the database 115, the access control module 130 is operative to intersect the intersect ACL permissions 175 to the resulting set of permissions in operation 2. If there are no resulting set of permissions in operation 2, the access control module 130 intersects the total intersect ACL permissions 175 to the resulting set of permissions in operation 1. If there were no total replace ACL entries 180 and/or total union ACL entries 170, the access control module 130 intersects the total intersect ACL entries 175 to the base ACL entries 150.

The result of operation 3 is a final effective ACL. During the incremental calculation process of the access control module 130, any explicit denies of permissions will not be eliminated. Ultimately the explicit deny permission will be set in the final effective ACL and thus impact authorization.

To determine the final effective ACL rights/permissions of the subject 5 on the communication device 15 for the object 120, the following example is illustrated (not shown in FIG. 4):

Object→Access Control List (ACL)={{All Base ACL Entries}U{All Logical Expression ACL entries}}

In accordance with exemplary embodiments, this incremental approach will simplify an administrator's efforts in enforcing security requirements. Setting base ACLs and using the new keywords can reduce the necessity for specifying multiple, redundant ACL specifications.

Figure 2:
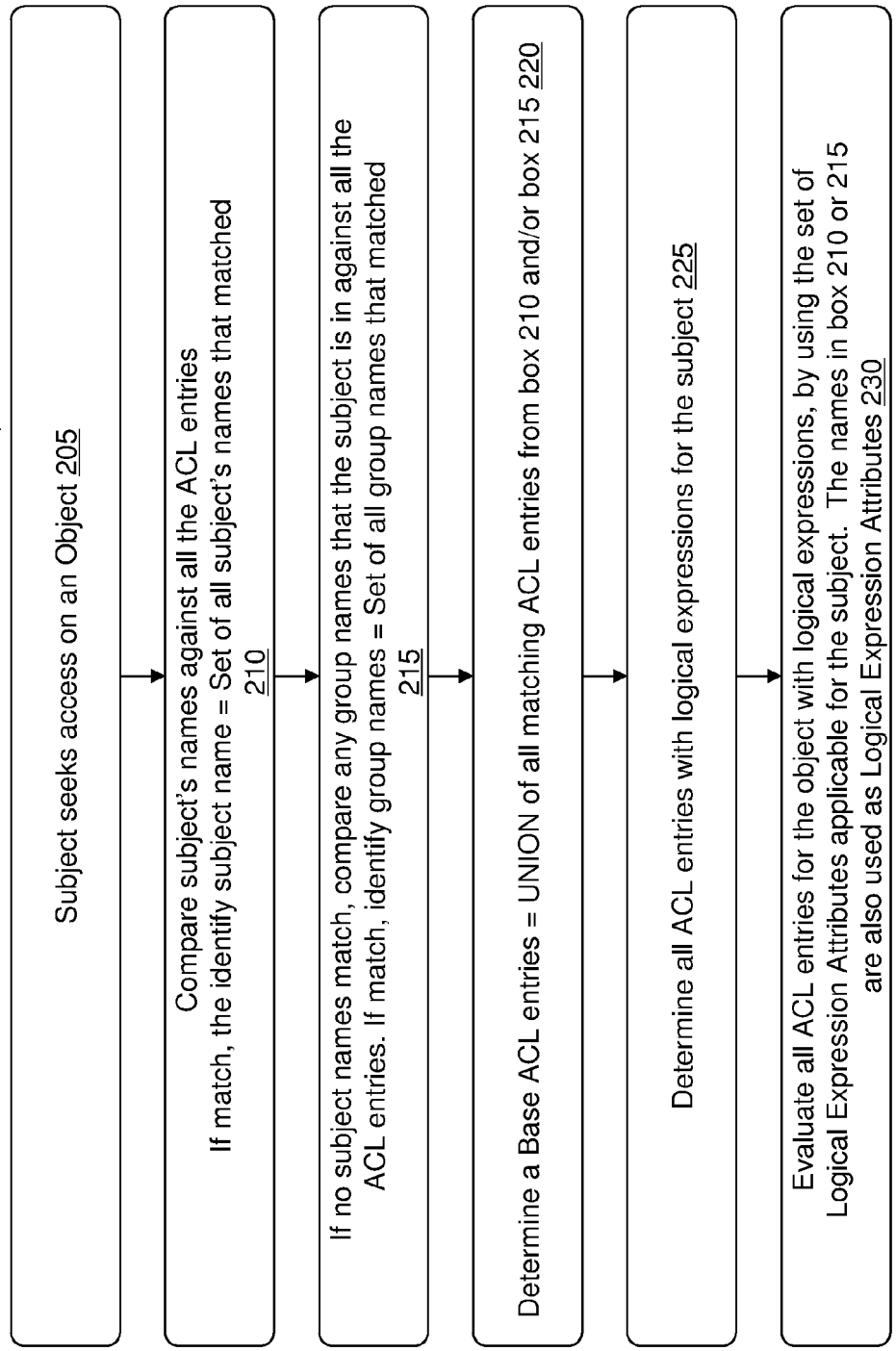
FIGS. 2 and 3 illustrate a flow chart in accordance with exemplary embodiments.
Figure 3:
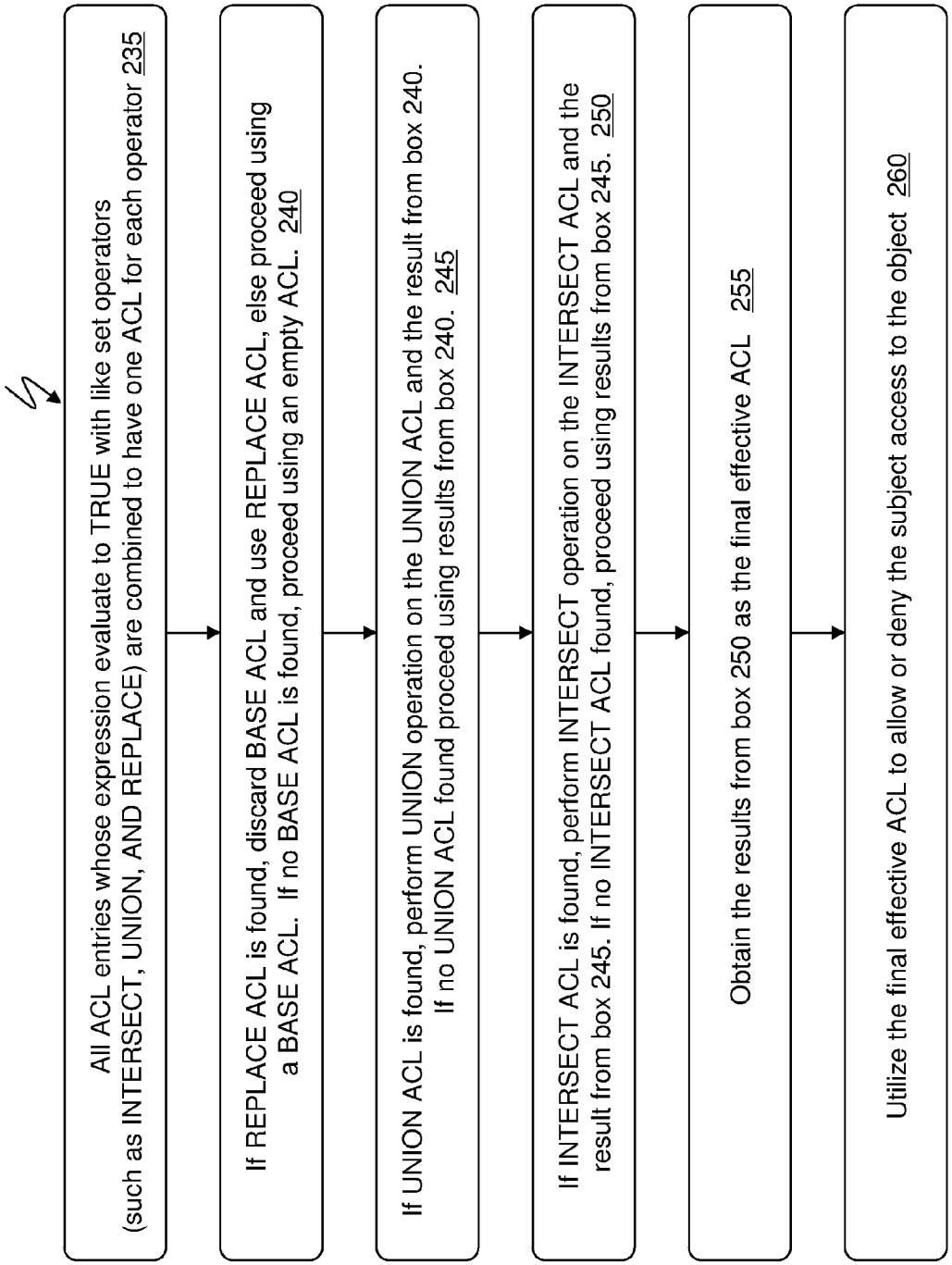

Now turning to FIGS. 2 and 3, FIGS. 2 and 3 illustrate a flow chart 200 in accordance with exemplary embodiments.

By communicating with the access control module 130, the subject 5 utilizing the communication device 15 seeks and requests access on the object 120 of the server 20 at 205. The subject 5 may input various credentials, such as a distinguished name (DN) to the access control module 130.

The access control module 130 is operative to compare the subject's 5 distinguished names (DNs) against all the ACL entries in the database 115, and if a match is found, the access control module 130 is operative to identify DN=Set of all subject DNs that matched at 210.

If no subject 5 DNs match, the access control module 130 is operative to compare any group DNs that the subject 5 belongs to against all the ACL entries in the database 115, and if a match found, the access control module 130 is operative to identify DN=Set of all group DNs that matched at 215.

The access control module 130 is operative to determine a Base ACL=UNION of all matching ACL entries from operation 210 or operation 215 at 220. The result of operation 220 is the base ACL entries 150.

The access control module 130 is operative to determine all ACL entries with logical expressions for the object 120 at 225. The result of the operation 225 is LE expression ACL entries 160.

The access control module 130 is operative to evaluate all LE ACL entries 160 for the object 120 with logical expressions, by using the set of logical expression attributes applicable for the subject 5 at 230. The logical expression attributes evaluated by the access control module 130 for the subject 5 include the IP address of the communication device 15, the day the subject 5 attempts to access the object 120, the day the subject 5 attempts to access the object 120, the connection type of the communication device 15 to the server 20, and/or the authentication mechanism. Note an administrator may decide on a different set of LEAs in accordance with exemplary embodiments. For example, the access control module 130 is operative to determine whether the following logical expression is true and provide the rights therein: (IP=192.5.1.2 AND Time>5 am AND Day=Monday): INTERSECT→{Write, Delete}

The access control module 130 is operative to combine via union all ACL entries whose expression evaluate to TRUE with like set operators (such as INTERSECT, UNION, AND REPLACE) to have one ACL for each operator at 235. For example, all the ACL entries in the database 115 for the object 120 with union operators in the LE ACL entries 160 that evaluate to TRUE are combined by the access control module 130 to result in the total union ACL entries 170. Similarly, all the ACL entries with intersect operators in the LE ACL entries 160 that evaluate to true are combined to result in the total intersect ACL entries 175. Likewise, all the ACL entries with replace operators in the LE ACL entries 160 that evaluate to true are combined to result the total replace ACL entries 180.

Figure 5:
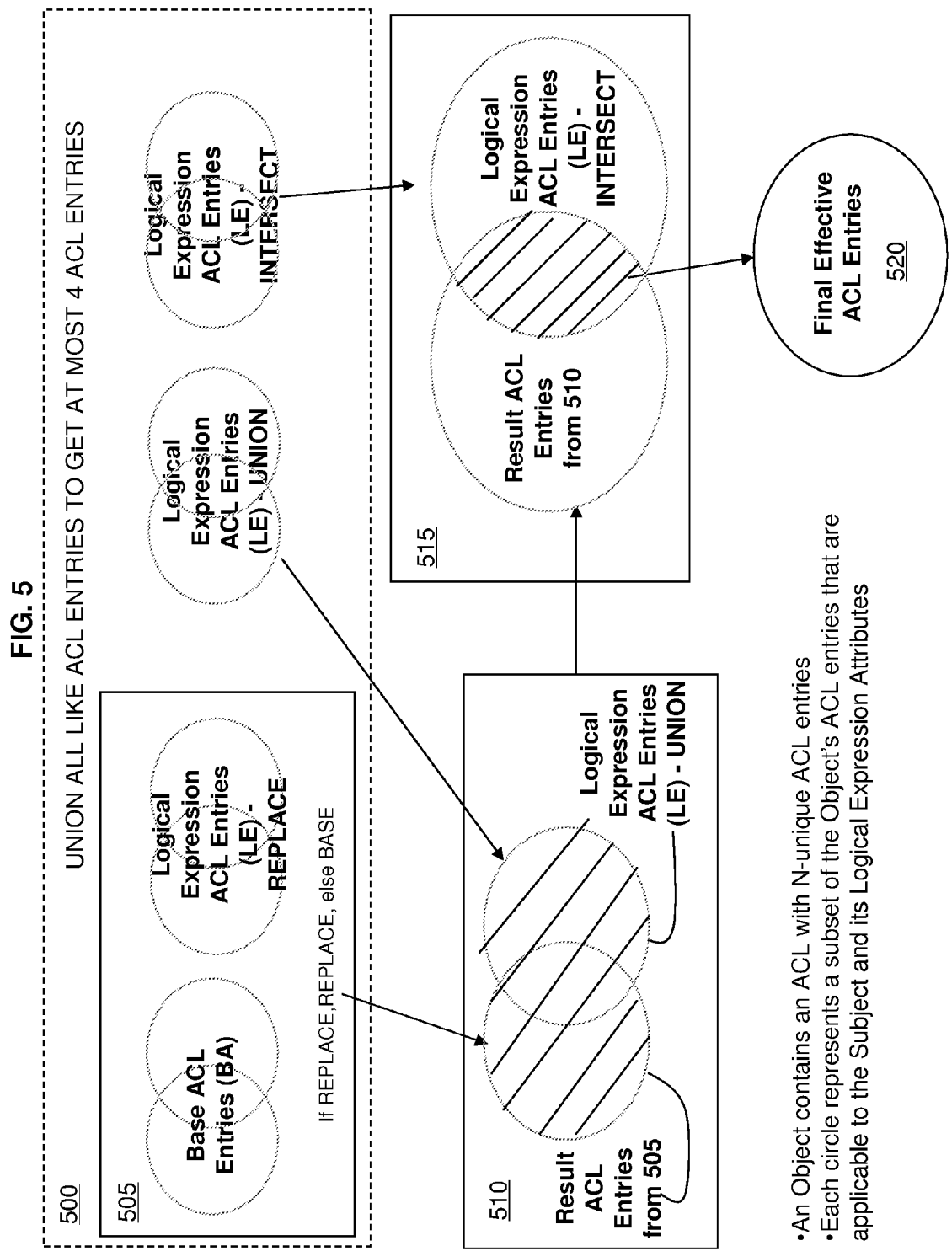
FIG. 5 illustrates a Venn diagram in accordance with exemplary embodiments.

In addition to FIGS. 2 and 3, reference will also be made to FIG. 5. FIG. 5 depicts a Venn diagram to illustrate features of exemplary embodiments. In FIG. 5, box 500 shows the base ACL entries 150, the total logical expression union ACL entries 170, the total logical expression intersect ACL entries 175, and/or the total logical expression replace ACL entries 180.

After determining the LE ACL entries 160 evaluating to TRUE which include the total union entries 170, the total intersect entries 175, and/or the total replace entries 180, the access control module 130 proceeds to incrementally determine the rights for the subject 5 utilizing these the total entries 170, 175, and 180. The access control module 130 is operative to evaluate the following expression: If REPLACE ACL is found, discard only BASE ACL, and use the REPLACE ACL; else proceed using a BASE ACL; and if no BASE ACL is found, proceed using an empty ACL at 240. Referring to FIG. 5, box 505 depicts the control access control module 130 being operative to perform the replace operation to replace the base ACL entries 150 with the total logical expression replace ACL entries 180.

The access control module 130 is operative to evaluate the following expression: If UNION ACL is found, perform UNION operation on the UNION ACL and the result from operation 240, and if no UNION ACL found, proceed using results from operation 240 at 245. Referring to FIG. 5, box 510 depicts the access control module 130 being operative to perform the union operation to union the results of box 505 with the total logical expression union ACL entries 170.

The access control module 130 is operative to evaluate the following expression: If INTERSECT ACL is found, perform INTERSECT operation on the INTERSECT ACL and the result from operation 245, and if no INTERSECT ACL found, proceed using results from the operation 245 at 250. Referring to FIG. 5, box 515 depicts the access control module 130 being operative to perform the intersect operation to intersect the results of box 510 with the total logical expression intersect ACL entries 175.

The access control module 130 is operative to obtain the results from the operation 250 as the final effective ACL at 255. Referring to FIG. 5, box 520 depicts the final effective ACL entries for the subject 5 utilizing the communication device 15. The final effective ACL entries are the rights/permissions for the subject 5.

The access control module 130 is operative to utilize the final effective ACL to allow or deny the subject access to the object 120 on the server 20 at 260. For example, the process of replacing, unioning, and/or intersecting results in a set of rights specific for the object 120, given the subject 5 and its logical expression attributes. These rights govern what the subject 5 may or may not do.

In exemplary embodiments, the object 120 is the resource being protected via the access control list. As an example, the object 120 may be various webpages hosted on the server 20, and the subject 5 is requesting to access the webpages of the server 20. A subject, such as the subject 5 and/or the communication device 15, is the entity seeking access to the object. The subject has a set of N identities and/or distinguished names (DN). A group is a set of N subjects, and the group identified with its own DN.

Rights are the permissions granted or denied. Set operator is one of intersect, union, and/or replace. Access control list (ACL) is a list of unique N subject/group DN to rights mapping entries and/or logical expression+set operator to rights mapping entries. For example:
Subj1→{Read, Write, Copy}
Group2→{Delete, Rename, Update; Deny Read}
(IP=192.5.1.2 AND Time>5 am AND Day=Monday):
INTERSECT→{Write, Delete}.

For each object, LEAs are defined by the access control module 130. The logical expression entries and base ACL entries are linked to the object. The LEAs correspond to the subject. The subject's LEAs are used to evaluate the Logical expression ACL entries linked to the object.

Further with regard to the set operator types, the following is a definition for the intersect operator: set A INTERSECT set B=set C, where set C only contains elements in BOTH A and B. The following is an intersect operator example: {A,B,C,D} INTERSECT {B,C,E,F}={B,C}. The intersect operation results in a reduction of rights for the subject unless both sets being intersected are identical.

The following is a definition for the union operator: set A UNION set B=set C, where set C contains elements in EITHER A or B. The following is a union operator example: {A,B,C,D} UNION {B,C,E,F}={A,B,C,D,E,F}. The union operation results in an augmentation of rights for the subject unless both sets being unioned are identical.

The replace operation replaces base permissions with the permissions of the logical expression for the replace permissions, and there does not have to be a match between the base permissions and the replace permissions.

In one implementation of exemplary embodiments, when combining the base permissions of the base ACL entries with the permissions of the total union ACL entries, the total intersect ACL entries, and the total replace ACL entries, first the replace operation is performed, second the union operation is performed, and third the intersect operation is performed.

With reference to FIG. 1, exemplary embodiments are not limited to but are capable of being implemented in the block diagram 100 illustrated in FIG. 1. Additionally, the servers 20 may be representative of numerous servers. The communication devices 15 and subjects 5 may be representative of numerous communication devices and subjects, which represent entities. The workstations 10 and the network 30 may be representative of numerous workstations, and networks. Also, the object 120 may be representative of numerous resources. Therefore, the block diagram 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1. Also, the servers 20, the communication devices 15, and the workstations 10 may be implemented in processor-based computer systems as discussed in FIG. 6 and be programmed to operate and function in accordance with exemplary embodiments.

Figure 6:
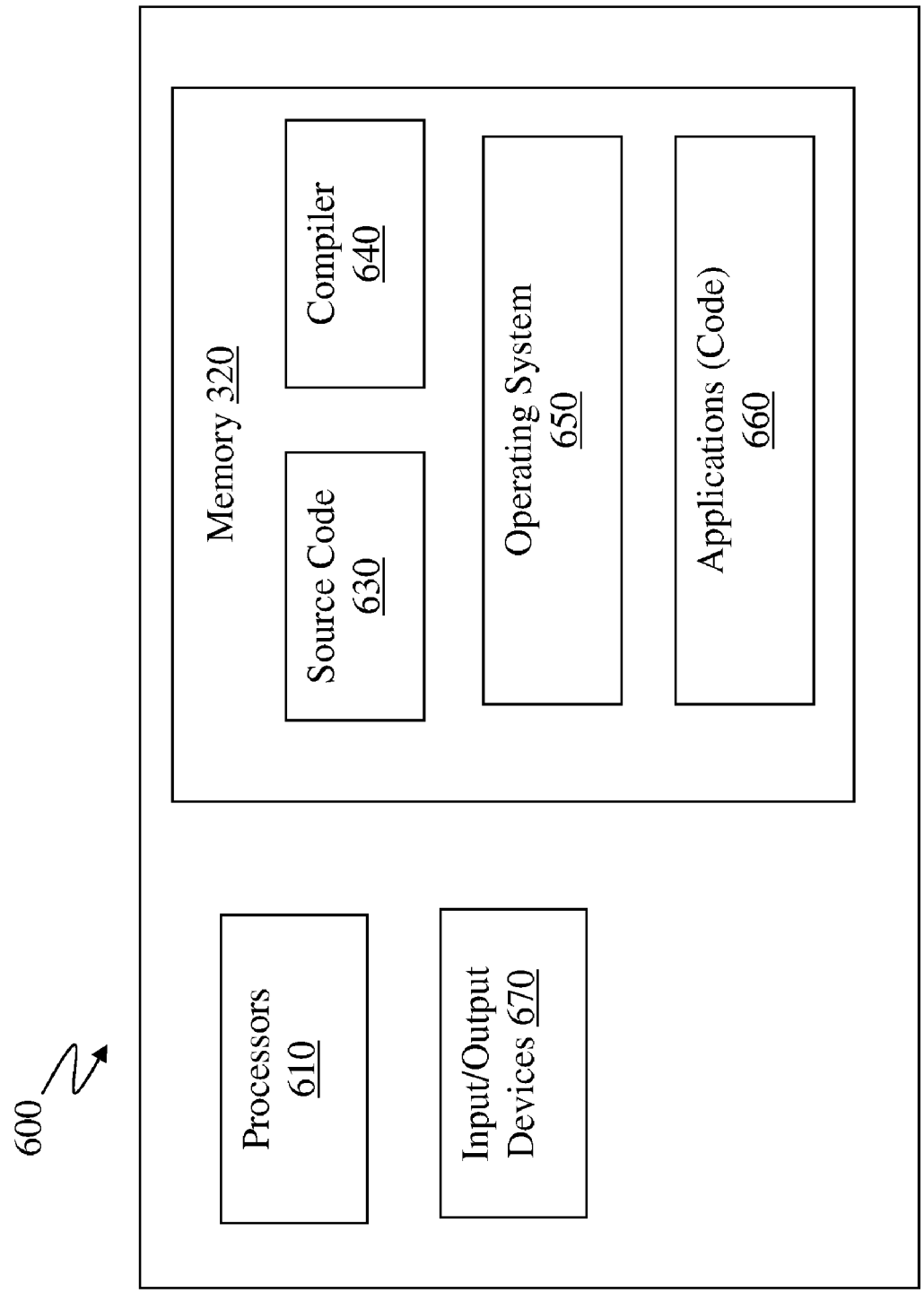
FIG. 6 illustrates an example of a computer having capabilities, which may be included in exemplary embodiments.

FIG. 6 illustrates an example of a computer 600 having capabilities, which may be included in exemplary embodiments. Various methods, procedures, modules, flow diagrams, and techniques discussed herein may also incorporate and/or utilize the capabilities of the computer 600. One or more of the capabilities of the computer 600 may be implemented in any element discussed herein, such as the communication device 15, the workstation 10, and the servers 20.

Generally, in terms of hardware architecture, the computer 600 may include one or more processors 610, computer readable memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc.

Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 610 utilizing Bluetooth connections and cables (via, e.g., Universal Serial Bus (USB) ports, serial ports, parallel ports, firewire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 620 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, and systems discussed herein, and it is understood that additional software and hardware components may be included in the various devices and systems discussed in exemplary embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for modifying base permissions of access control lists by evaluating logical expressions on a server to determine permissions for a subject in response to a verification request, comprising:

determining, by a server, base permissions for the subject by comparing a name of the subject against access control list entries for an object, in response to the verification request from the subject requesting access to the object;

determining, by the server, the access control list entries for the object that comprise logical expression entries;

evaluating, by the server, the logical expression entries of the access control list entries for the object with logical expression attributes of the subject, wherein the logical expression entries are evaluated to determine which logical expression entries are true for the logical expression attributes of the subject;

for logical expression entries that are true, combining by the server set operators of the logical expression entries to have a single union access control list, a single intersect access control list, and a single replace access control list;

wherein a combination of all rights for a union operator type form the union access control list;

wherein a combination of all rights for an intersect operator type form the intersect access control list; and wherein a combination of all rights for a replace operator type form the replace access control list;

in response to there being the replace access control list, performing by the server a replace operation to replace the base permissions with the replace access control list during an incremental process to determine the permissions for the subject, wherein a result of the replace operation is a first output, and wherein in response to there being no replace access control list, the base permissions are the first output;

in response to there being the union access control list, performing by the server a union operation on the first output and the union access control list during the incremental process to determine the permissions for the subject, wherein a result of the union operation is a second output, and wherein in response to there being no union access control list, the first output is the second output;

in response to there being the intersect access control list, performing by the server an intersect operation on the second output and the intersect access control list during the incremental process to determine the permissions for the subject, wherein a result of the intersect operation is a third output, and wherein in response to there being no intersect access control list, the second output is the third output; and providing by the server the third output as the permissions for the subject;

wherein the replace operation is performed first, the union operation is performed second, and the intersect operation is performed third to define the incremental process to determine the permissions for the subject; and wherein logical expression attributes comprise an IP address, a connection type, an authentication mechanism, an access time, an access date, and an access day.

2. The method of claim 1, wherein logical expression attributes are obtained from the subject;

wherein the intersect operation results in a reduction of rights for the subject;

wherein the union operation results in an augmentation of rights for the subject; and wherein the replace operation occurs based on utilizing a replace keyword.

3. The method of claim 1, wherein logical expression attributes further comprise: subject name, group name, and credential.

4. The method of claim 1, wherein the union access control list is a combination of logical expression entries that utilize a union operator.

5. The method of claim 1, where the union access control list is a combination of permissions for the object.

6. The method of claim 1, wherein the intersect access control list is a combination of logical expression entries that utilize a intersect operator.

7. The method of claim 1, where the intersect access control list is a combination of permissions for the object.

8. The method of claim 1, wherein the replace access control list is a combination of logical expression entries that utilize a replace operator.

9. The method of claim 1, where the replace access control list is a combination of permissions for the object.

10. A server configured to modify base permissions of access control lists by evaluating logical expressions to determine permissions for a subject in response to a verification request, comprising:

memory for storing a program; and a processor, functionally coupled to the memory, the processor being responsive to computer-executable instructions contained in the program and operative for:

determining base permissions for the subject by comparing a name of the subject against access control list entries for an object in response to the verification request from the subject requesting access to the object;

determining the access control list entries for the object that comprise logical expression entries;

evaluating the logical expression entries of the access control list entries for the object with logical expression attributes of the subject, wherein the logical expression entries are evaluated to determine which logical expression entries are true for the logical expression attributes of the subject;

for logical expression entries that are true, combining set operators of the logical expression entries to have a single union access control list, a single intersect access control list, and a single replace access control list;

wherein a combination of all rights for a union operator type form the union access control list;

wherein a combination of all rights for an intersect operator type form the intersect access control list; and wherein a combination of all rights for a replace operator type form the replace access control list;

in response to there being the replace access control list, performing a replace operation to replace the base permissions with the replace access control list, wherein a result of the replace operation is a first output, and wherein in response to there being no replace access control list, the base permissions are the first output;

in response to there being the union access control list, performing a union operation on the first output and the union access control list, wherein a result of the union operation is a second output, and wherein in response to there being no union access control list, the first output is the second output;

in response to there being the intersect access control list, performing an intersect operation on the second output and the intersect access control list, wherein a result of the intersect operation is a third output, and wherein in response to there being no intersect access control list, the second output is the third output; and providing the third output as permissions for the subject;

wherein the replace operation is performed first, the union operation is performed second, and the intersect operation is performed third to define an incremental process to determine the permissions for the subject; and wherein logical expression attributes comprise an IP address, a connection type, an authentication mechanism, an access time, an access date, and an access day.

11. The server of claim 10, wherein logical expression attributes are obtained from the subject.

12. The server of claim 10, wherein logical expression attributes further comprise: subject name, group name, and credential.

13. The server of claim 10, wherein the union access control list is a combination of logical expression entries that utilize a union operator.

14. The server of claim 10, where the union access control list is a combination of permissions for the object.

15. The server of claim 10, wherein the intersect access control list is a combination of logical expression entries that utilize a intersect operator.

16. The server of claim 10, where the intersect access control list is a combination of permissions for the object.

17. The server of claim 10, wherein the replace access control list is a combination of logical expression entries that utilize a replace operator.

18. The server of claim 10, where the replace access control list is a combination of permissions for the object.

19. A computer program product, tangibly embodied on a non-transitory computer readable medium, the computer program product including instructions for causing a computer to execute a method for modifying base permissions of access control lists by evaluating logical expressions to determine permissions for a subject in response to a verification request, comprising:

determining base permissions for the subject by comparing a name of the subject against access control list entries for an object in response to the verification request from the subject requesting access to the object;

determining the access control list entries for the object that comprise logical expression entries;

evaluating the logical expression entries of the access control list entries for the object with logical expression attributes of the subject, wherein the logical expression entries are evaluated to determine which logical expression entries are true for the logical expression attributes of the subject;

for logical expression entries that are true, combining set operators of the logical expression entries to have a single union access control list, a single intersect access control list, and a single replace access control list;

wherein a combination of all rights for a union operator type form the union access control list;

wherein a combination of all rights for an intersect operator type form the intersect access control list; and wherein a combination of all rights for a replace operator type form the replace access control list;

in response to there being the replace access control list, performing a replace operation to replace the base permissions with the replace access control list, wherein a result of the replace operation is a first output, and wherein in response to there being no replace access control list, the base permissions are the first output;

in response to there being the union access control list, performing a union operation on the first output and the union access control list, wherein a result of the union operation is a second output, and wherein in response to there being no union access control list, the first output is the second output;

in response to there being the intersect access control list, performing an intersect operation on the second output and the intersect access control list, wherein a result of the intersect operation is a third output, and wherein in response to there being no intersect access control list, the second output is the third output; and providing the third output as permissions for the subject wherein the replace operation is performed first, the union operation is performed second, and the intersect operation is performed third to define an incremental process to determine the permissions for the subject; and wherein logical expression attributes comprise an IP address, a connection type, an authentication mechanism, an access time, an access date, and an access day.

* * * * *